United States Patent
Yoshida

(10) Patent No.: US 10,289,242 B2
(45) Date of Patent: *May 14, 2019

(54) DISPLAY DEVICE AND METHOD OF CONTROLLING THE SAME

(71) Applicant: Japan Display Inc., Tokyo (JP)

(72) Inventor: Masahiro Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 15/678,856

(22) Filed: Aug. 16, 2017

(65) Prior Publication Data

US 2017/0344182 A1 Nov. 30, 2017

Related U.S. Application Data

(63) Continuation of application No. 15/331,413, filed on Oct. 21, 2016, now Pat. No. 9,778,788, which is a
(Continued)

(30) Foreign Application Priority Data

Oct. 9, 2013 (JP) .................................. 2013-211888
Jul. 14, 2014 (JP) .................................. 2014-144322

(51) Int. Cl.
*G09G 3/36* (2006.01)
*G06F 3/041* (2006.01)
*G06F 3/0488* (2013.01)

(52) U.S. Cl.
CPC ........ *G06F 3/0416* (2013.01); *G06F 3/04883* (2013.01); *G09G 3/3659* (2013.01);
(Continued)

(58) Field of Classification Search
CPC . G06F 3/0416; G06F 3/04883; G09G 3/3659; G09G 2320/0252;
(Continued)

(56) References Cited

U.S. PATENT DOCUMENTS 4,712,185 A 12/1987 Aoki
4,730,186 A 3/1988 Koga et al.
(Continued)

FOREIGN PATENT DOCUMENTS

JP 60-260994 A 12/1985
JP 09-212140 A 8/1997
(Continued)

OTHER PUBLICATIONS

Office Action from Japan Office Action dated May 9, 2017, for Application No. JP2014-144322.

*Primary Examiner* — Mihir K Rayan
(74) *Attorney, Agent, or Firm* — Michael Best & Friedrich LLP

(57) ABSTRACT

According to one embodiment, a display device comprises a plurality of pixel circuits arrayed two-dimensionally. Each of the pixel circuits comprises a display element and a pixel memory configured to store a signal to drive the display element. An X-directional driver and a Y-directional driver can select arbitrary pixel circuits and drive the pixel circuits. A touch panel controller converts a sensing output of a touch-type input panel to coordinate data. A display controller receives the coordinate data and partially rewrites the coordinate data in units of pixel circuits of the display device via the X-directional driver and the Y-directional driver.

10 Claims, 15 Drawing Sheets

Related U.S. Application Data continuation of application No. 14/509,442, filed on Oct. 8, 2014, now Pat. No. 9,507,458.

(52) U.S. Cl.
CPC ............... *G09G 2300/0842* (2013.01); *G09G 2310/0286* (2013.01); *G09G 2310/0291* (2013.01); *G09G 2320/0252* (2013.01)

(58) Field of Classification Search
CPC ... G09G 2310/0291; G09G 2310/0286; G09G 2300/0842
See application file for complete search history.

(56) References Cited

U.S. PATENT DOCUMENTS

| | | | |
|---|---|---|---|
| 4,831,568 A | 5/1989 | Ito | |
| 5,357,266 A | 10/1994 | Tagawa | |
| 5,563,480 A | 10/1996 | Okada | |
| 5,945,972 A | 8/1999 | Okumura et al. | |
| 6,331,844 B1* | 12/2001 | Okumura | G09G 3/2011 345/100 |
| 6,563,480 B1 | 5/2003 | Nakamura | |
| 9,507,458 B2* | 11/2016 | Yoshida | G06F 3/04883 |
| 9,778,788 B2* | 10/2017 | Yoshida | G06F 3/04883 |
| 2002/0050969 A1 | 5/2002 | Ohura | |
| 2002/0126114 A1 | 9/2002 | Yatabe | |
| 2002/0190940 A1* | 12/2002 | Itoh | G09G 3/3648 345/87 |
| 2003/0006977 A1* | 1/2003 | Hanari | G09G 3/3233 345/204 |
| 2004/0048422 A1* | 3/2004 | Kurosawa | H01L 27/1237 438/151 |
| 2005/0104877 A1 | 5/2005 | Nakamura et al. | |
| 2005/0212916 A1 | 9/2005 | Nakamura et al. | |
| 2006/0033729 A1 | 2/2006 | Yoshida et al. | |
| 2006/0192766 A1 | 8/2006 | Nakamura et al. | |
| 2006/0268642 A1 | 11/2006 | Chen et al. | |
| 2008/0246740 A1 | 10/2008 | Nakamura et al. | |
| 2010/0109990 A1 | 5/2010 | Harada | |
| 2010/0128019 A1 | 5/2010 | Harada | |
| 2010/0182273 A1 | 7/2010 | Noguchi et al. | |
| 2010/0328298 A1 | 12/2010 | Nakanishi | |
| 2012/0038604 A1 | 2/2012 | Liu et al. | |
| 2013/0135191 A1 | 5/2013 | Shiokawa | |
| 2014/0146013 A1 | 5/2014 | Noguchi et al. | |

FOREIGN PATENT DOCUMENTS

| | | |
|---|---|---|
| JP | 2002-175040 A | 6/2002 |
| JP | 2006-244218 A | 9/2006 |
| JP | 2008-015755 A | 1/2008 |
| JP | 2009-244958 A | 10/2009 |
| JP | 2010-107732 A | 5/2010 |
| JP | 2010-117550 A | 5/2010 |
| JP | 2010-128014 A | 6/2010 |
| JP | 2013-114276 A | 6/2013 |

\* cited by examiner

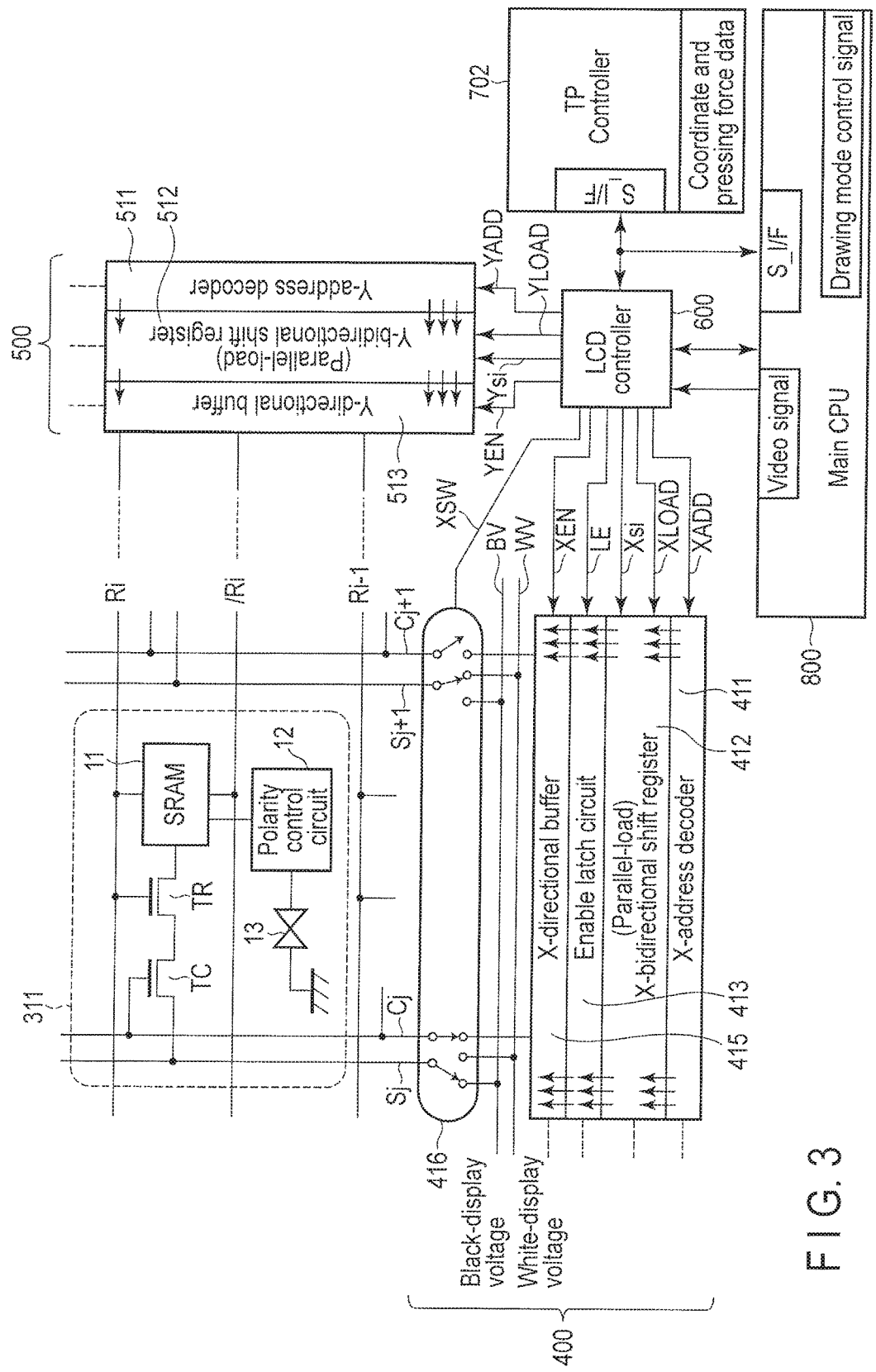
F I G. 3

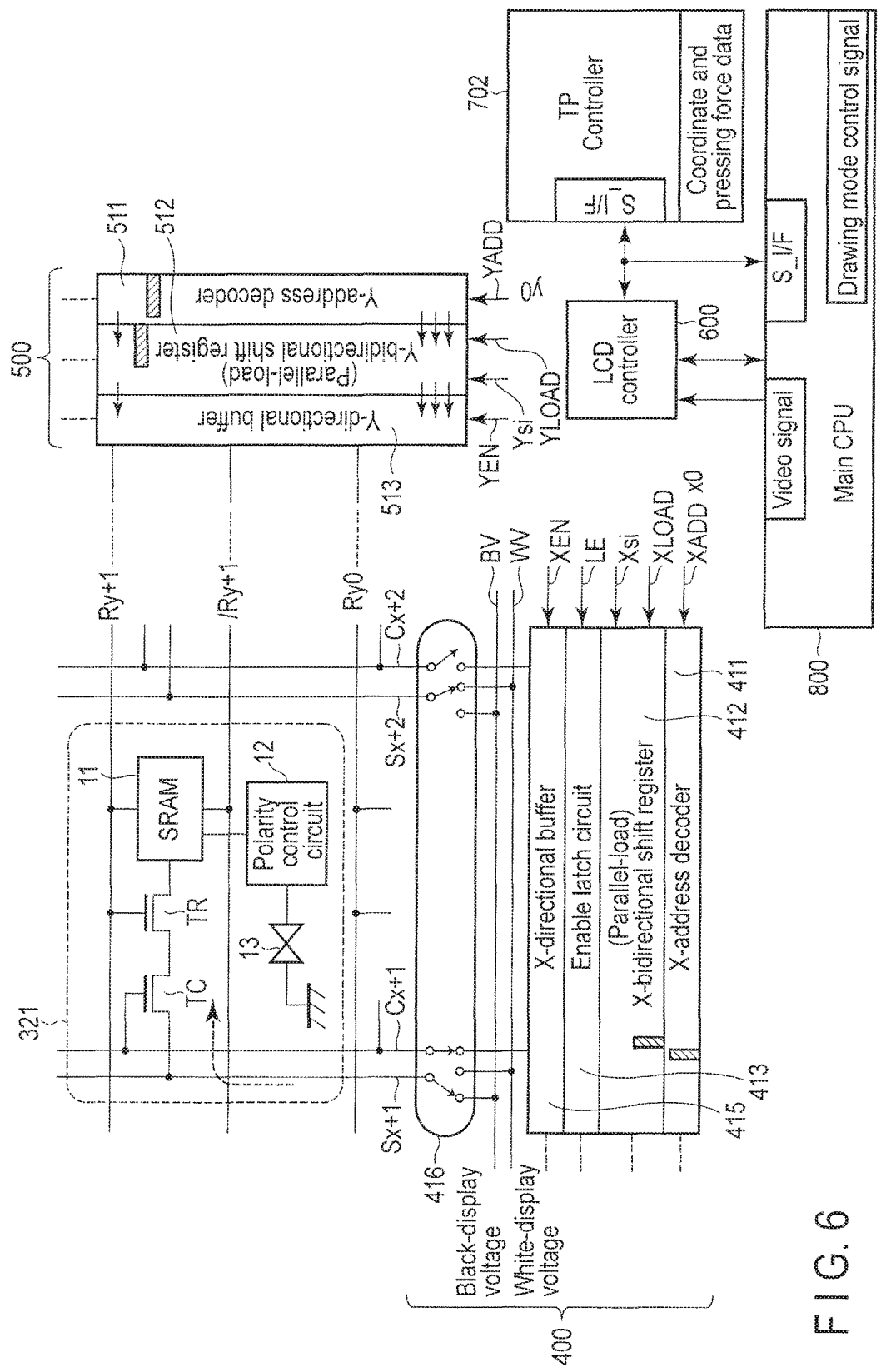
F I G. 6

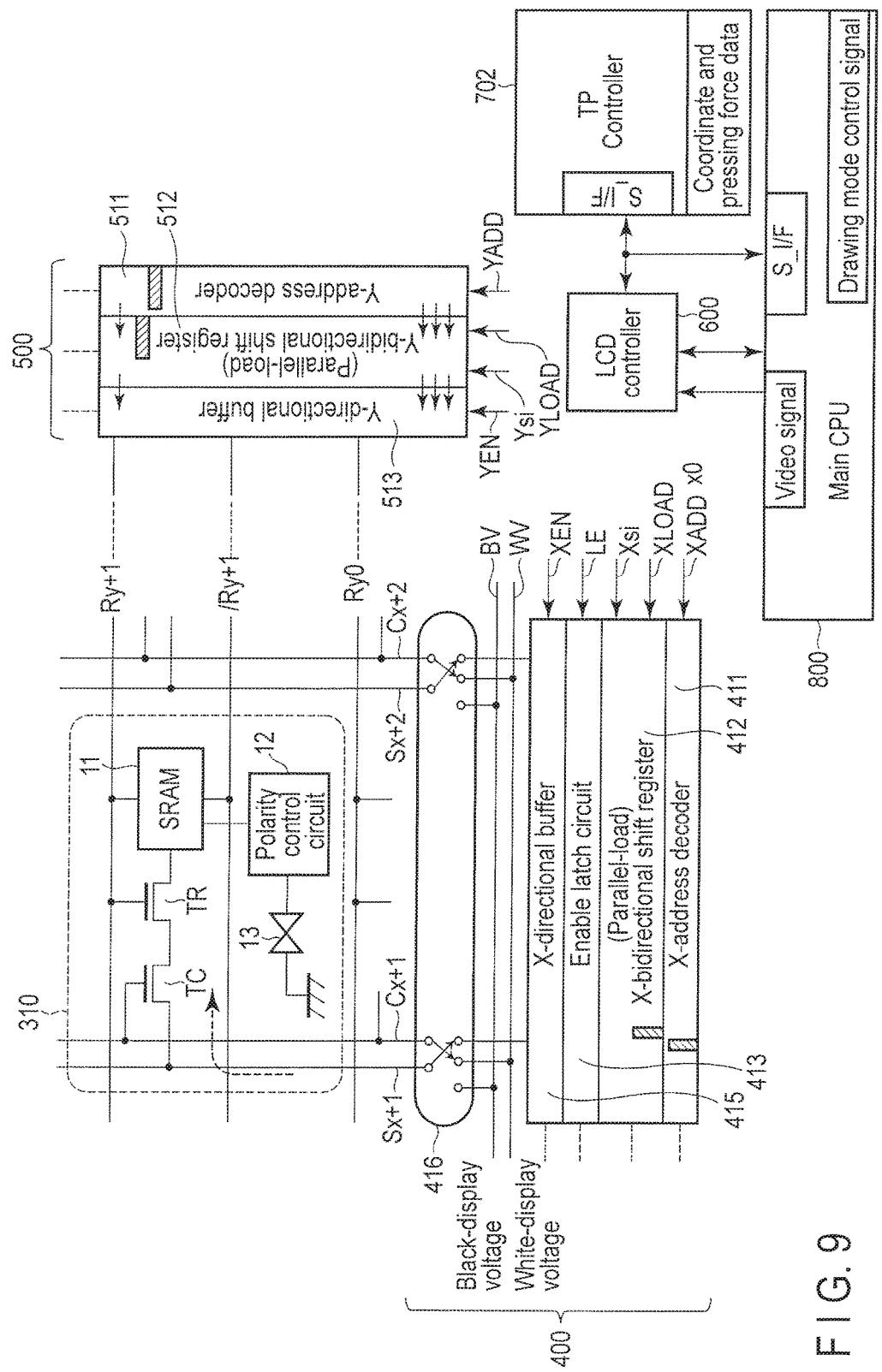
F I G. 9

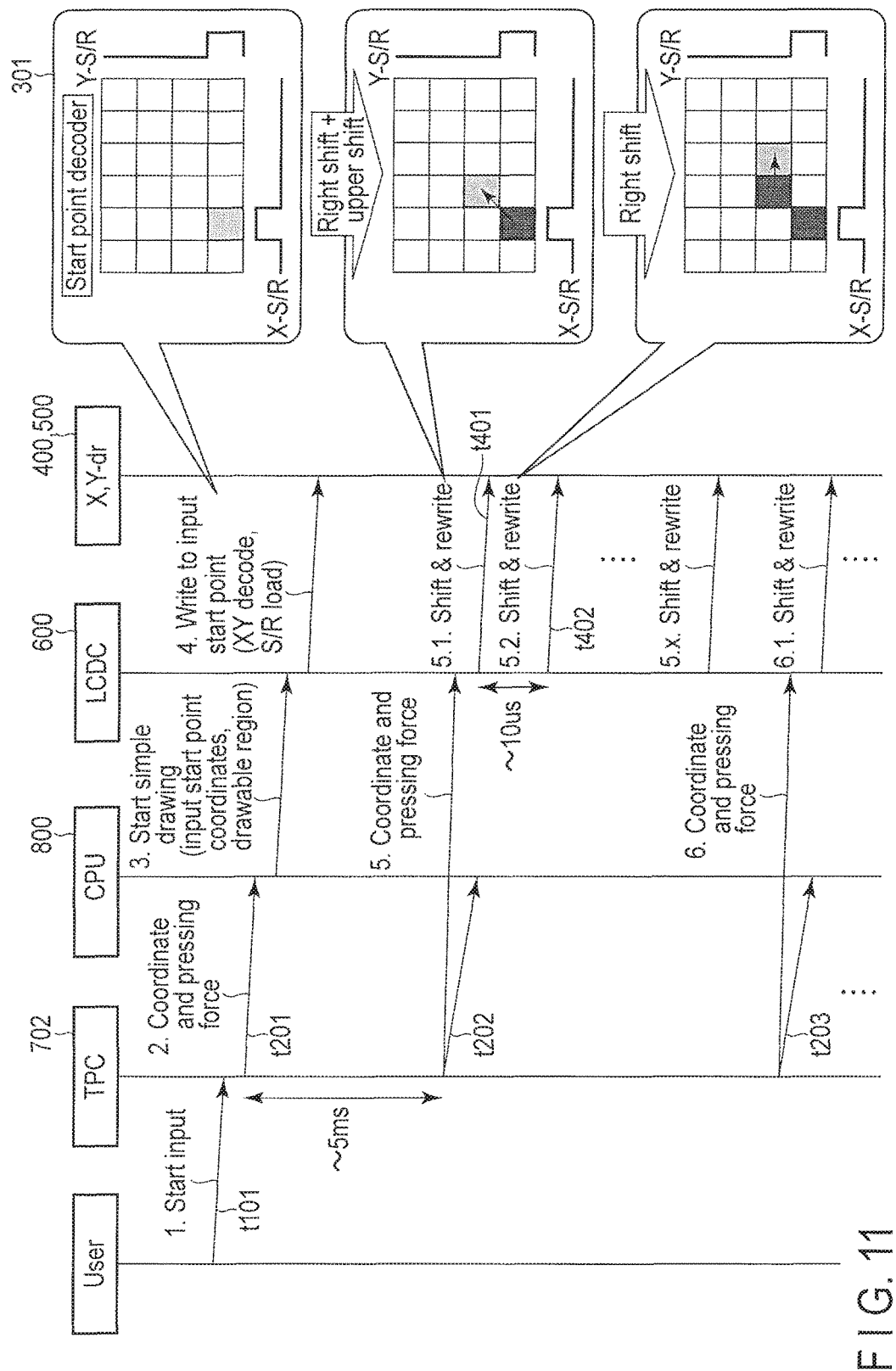
F I G. 11

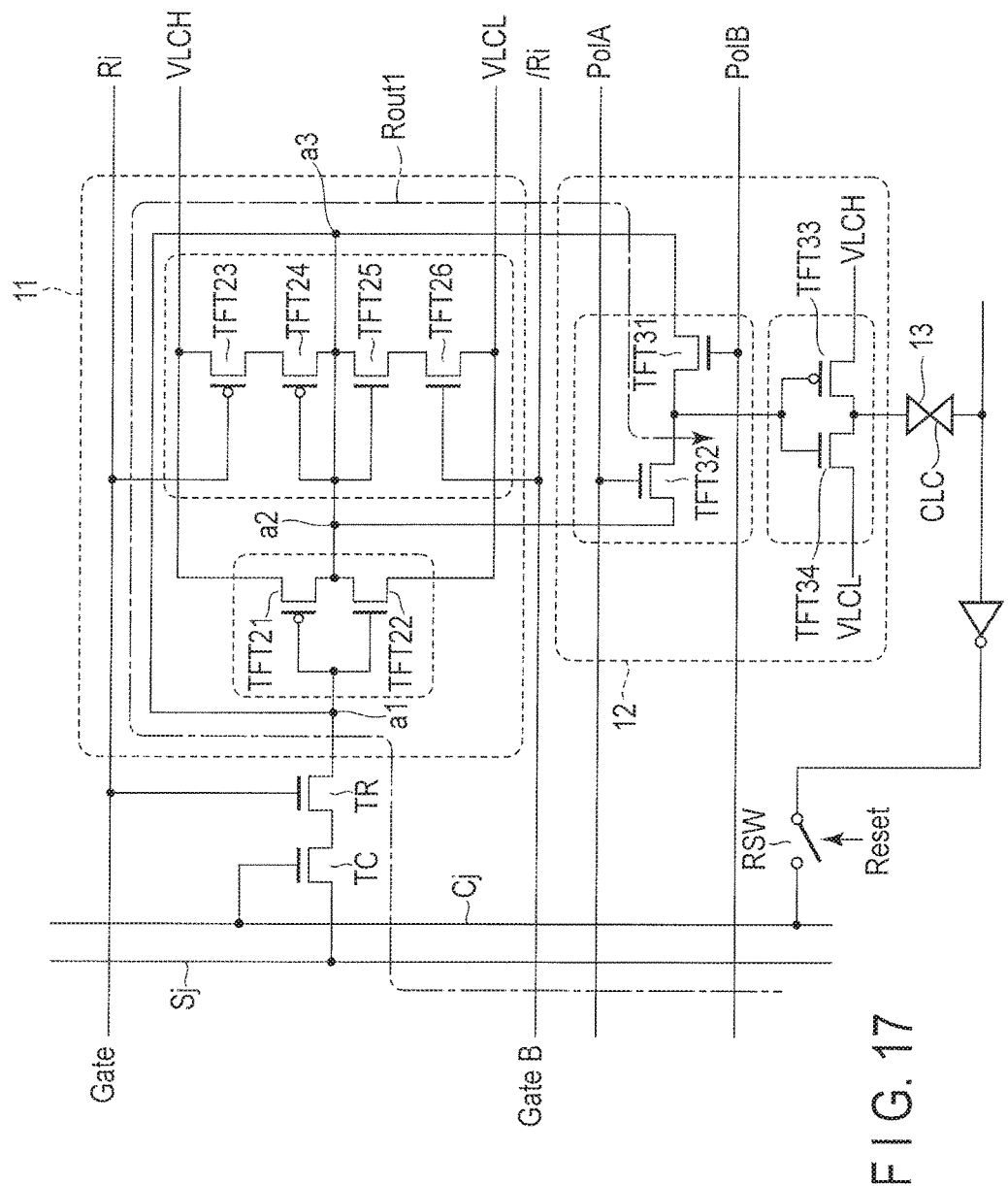
F I G. 17

DISPLAY DEVICE AND METHOD OF CONTROLLING THE SAME

CROSS-REFERENCE TO RELATED APPLICATIONS

This is a Continuation Application of U.S. patent application Ser. No. 15/331,413, filed Oct. 21, 2016, which is a Continuation Application of U.S. patent application Ser. No. 14/509,442, filed Oct. 8, 2014, now U.S. Pat. No. 9,507,458, issued Nov. 29, 2016, which claims priority from Japanese Priority Patent Applications JP 2013-211888 filed Oct. 9, 2013 and JP 2014-144322 filed Jul. 14, 2014, the entire contents of which are incorporated herein by reference.

FIELD

Embodiments described herein relate generally to a 10, display device and a method of controlling the display device and, in particular, to improvement of a handwriting input circuit, a handwriting input method and a handwriting input program.

BACKGROUND

Recently, a display device integrally comprising, for example, a liquid crystal display device (also called a display panel) and a touch-type input panel has been developed. The display device is utilized for an electronic devices (including mobile terminals such as smartphones, tablet computers, and personal assistant devices (PAD)).

One of the touch-type input panels is a handwriting input device capable of inputting data by allowing a pen or a finger to touch a display screen and allowing the pen or the finger in the touching state to move on the display screen.

The handwriting input device is also called a coordinate input device, and is constituted by providing a touch detection surface of the touch-type input panel on the display screen of the display device. Systems of the resistance type, capacitive type, electromagnetic induction type, and so on are developed as the system of sensing the handwriting input. For example, the handwriting input by pen is sensed by the touch detection surface and, this sensing data including a position of the pen on the display screen and a pressing force for pressing the display screen is converted to coordinate data and pressing force data by a touch panel (TP) controller.

The coordinate data and the pressing force data are processed by a central processing unit (CPU) such as an application processor and a microcomputer. The CPU allows movement locus of the pen to be stored in a frame memory as video data, which may also be called drawing data, and transmits the video data to the liquid crystal display device, which is configured to display the data, at a frame rate of, for example, approximately 60 Hz. Thus, The movement locus by pen is displayed on a display module of a liquid crystal display device as a line and updated.

In the above-described devices, processing delay caused by executing programs such as an operation system (OS) and applications operated on the CPU, or delay associated with interfaces between the CPU and a TP controller IC or LCD controller occurs.

As a result, it is difficult for the above devices to make the line drawn on the display device follow a touch position (pen tip) instructed by a user immediately at the handwriting input mode.

The delay is, generally, approximately 100 ms, which is considered as a reason for degrading convenience of the handwriting input device. In addition, there is another problem that during the handwriting input, the power consumption becomes increased since the display screen needs to continue updated as a whole, at any time, at a frame rate of, for example, approximately 60 Hz.

BRIEF DESCRIPTION OF THE DRAWINGS

FIG. 3 is an illustration mainly showing an example of a basic configuration of a pixel circuit 310, and showing an example of configuration of an X-directional driver and a Y-directional driver.

FIG. 6 is an illustration mainly showing an operation example of the embodiment together with signal flows, in a pixel circuit 321 shown in FIG. 2.

FIG. 9 is an illustration showing an operation example of general drawing of the embodiment together with signal flows, by referring to the pixel circuit 310.

FIG. 11 is an illustration showing a situation of drawing on an LCD to describe an operation example of the embodiment.

FIG. 17 is an illustration showing an example of specific configurations of a memory 11 shown in FIG. 3 and a polarity inverting circuit.

DETAILED DESCRIPTION

Figure 1:
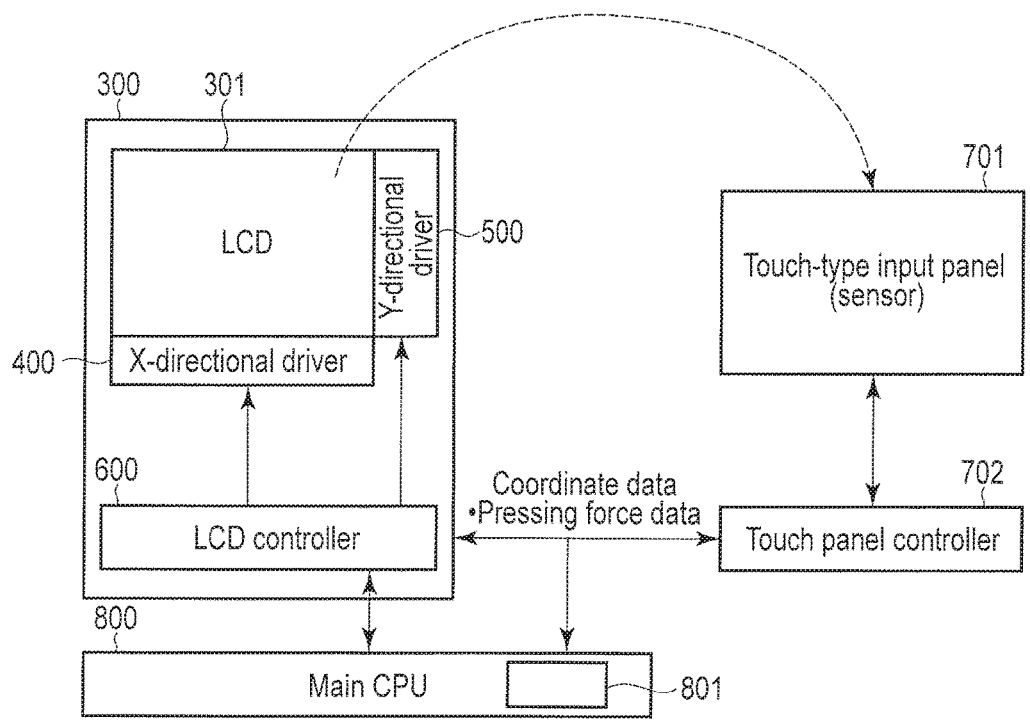
FIG. 1 is an illustration showing an example of an overall configuration of a display device of an embodiment.

Various embodiments will be described hereinafter with reference to the accompanying drawings.

The embodiments provide a display device and a display device controlling method capable of remarkably improving followability of an image forming velocity on a display screen to a handwriting input velocity.

In general, according to one embodiment, a display device 301 comprises a plurality of pixel circuits arrayed two-dimensionally. Each of the pixel circuits comprises a display element and a pixel memory configured to store a signal to drive the display element. An X-directional driver 400 and a Y-directional driver 500 can select arbitrary pixel circuits and drive the pixel circuits. A touch-type input panel 701 is arranged integrally with the display device. A touch panel controller 702 converts a sensing output of the touch-type input panel 701 to coordinate data. A display controller 600 receives the coordinate data and partially rewrites the coordinate data in units of pixel circuits of the display device 301 via the X-directional driver and the Y-directional driver.

The embodiment will be described in more detail with reference to the drawings. In the embodiment, a "handwriting input mode" is distinguished from a "general drawing mode". The handwriting input mode indicates that a locus formed, on the touch input type panel by moving a pen or finger tip in a state of contacting the touch-type input panel is recognized by an immediate response, and then the data of the locus is drawn on the display screen. The general drawing mode indicates rewriting video data or drawing data displayed on the display screen, in a cycle of rewriting an entire screen of the display device.

FIG. 1 is an illustration showing configuration blocks of a liquid crystal display device of the embodiment. The liquid crystal display device comprises the liquid crystal display device (LCD) 301 and the touch sensor type input panel 701. The LCD 301 comprises a glass substrate 300. A plurality of pixel circuits arranged two-dimensionally, and an X-directional driver 400 and a Y-directional driver 500 configured to drive the pixel circuits are provided on the glass substrate 300.

In addition, the LCD controller (for example, IC chip configuration) 600 configured to control the drivers 400 and 500 is provided on the glass substrate 300. The LCD controller 600 supplies an X address to the X-directional driver 400 and a Y address to the Y-directional driver 500, and pixel circuits to be driven are thereby determined.

The touch-type input panel 701 is arranged in a state of being overlaid on the display screen of the liquid crystal display device (LCD) 301. In FIG. 1, the liquid crystal display device 301 and the touch-type input panel 701 are separately displayed to allow the configuration to be easily understood. However, the configuration of the liquid crystal display device 301 or the touch-type input panel 701 can serve as the configuration of a part of the other.

Thus, it is assumed here that an image of an operation button is displayed on the display screen of the LCD 301. An action of pressing the image of the operation button by the pen or finger is to press the portion of the touch type input panel overlaid on the display screen. The touch of the pen or finger is thereby sensed by the touch-type input panel 701.

The touch-type input panel 701 is a touch sensor in, for example, resistance type, capacitive type, self-capacitance type, electromagnetic induction type, and so on. The touch-type input panel 701 is electrically connected to the touch panel controller (TP controller) 702.

The TP controller 702 is formed by, for example, electrically connecting a plurality of IC chips. A sensing output of the touch-type input panel 701 is input to the TP controller 702 and converted to coordinate data, which may include pressing force data.

The pressing force data can be detected in various methods. According to the methods, for example, a specifically processed sheet (protection sheet) is provided between a pen touch portion and a sensor electrode and, in accordance with pressure of the pen, capacitance between the pen tip and the sensor electrode is caused to vary, or electromagnetic strength is caused to vary, or resistance is caused to vary. These variations are detected electrically.

The TP controller 702 is connected to the LCD controller 600, to immediately transmit the touch position (coordinate data and pressing force data), which input panel 701 by touching the touch-type input panel 701 by pen, to the pixel circuits in the LCD 301. In addition, the TP controller 702 is connected to a main CPU 800. Thus, the pen touch position (coordinate data and pressing force data) can be stored in the maul CPU 800, and this enables the LCD 301 to display the pen touch position and the locus of the pen later again. More specifically, the main CPU 800 is connected to the LCD controller 600 to supply the video data to be drawn and a timing signal for driving to the LCD controller 600. In addition, the main CPU 800 includes a frame memory 801. A coordinate data between first coordinate data and second coordinate data input intermittently from the TP controller 702 is interpolated by linear approximation, the main CPU 800 can construct linear video data which the first coordinate data is linked to the second coordinate data, and possess the line video date in the frame memory 801. Note, the linear video data is read from the frame memory 801 in the general drawing mode different from the handwriting input mode.

Figure 2:
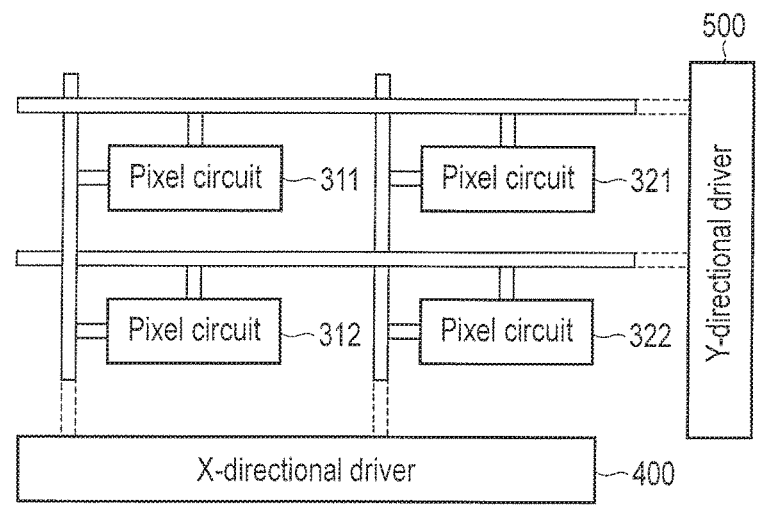
FIG. 2 is an illustration showing a schematic configuration of an LCD panel shown in FIG. 1.

FIG. 2 shows a basic configuration example of a plurality of pixel circuits 311, 312, 321, 322, . . . arrayed two-dimensionally in the LCD 301. Arbitrary pixel circuits are selectively designated by column designation executed by the X-directional driver 400 and row designation executed by the Y-directional driver 500. Four pixel circuits are shown in FIG. 2, but more pixel circuits are formed in the LCD 301.

FIG. 3 mainly shows a specific configuration example of the pixel circuit 311. The other pixel circuits have similar configuration. In addition, configuration examples of the X-directional driver 400 and the Y-directional driver 500 are shown in the drawing.

The pixel circuit 311 of the embodiment comprises a first transistor TC, a second transistor TR, a memory (SRAM: static random access memory) 11, a polarity control circuit 12 and a display element 13. In FIG. 3. The display element 13 equivalently shows a fine region in a part of a liquid crystal layer of the LCD 301.

Furthermore, a signal column line Sj and a control column line Cj extend in the pixel circuit 311. Through the signal column line Sj, a pixel signal can be supplied to an input terminal of the first transistor TC. Through the control column line Cj, a control signal can be supplied to a control electrode of the first transistor TC.

In addition, a select row line Ri (for one-way potential) and a select row line /Ri (for reverse potential) extend in the pixel circuit 311. The select row line Ri is connected to a control electrode of the second transistor TR. In addition, the select row line Ri is connected to one of electrode terminals of the memory 11.

The select row line /Ri is connected to the other electrode terminal of the memory 11. The memory 11 is also connected to the polarity control circuit 12, and an output of the memory 11 is supplied to an electrode of the display element 13 via the polarity control circuit 12. The polarity control circuit 12 is connected to the display element 13, and serves as a circuit configured to periodically change a polarity of a liquid crystal-applied voltage to the display element 13. The liquid crystal serving as the display element 13 can be thereby driven certainly.

The X-directional driver 400 comprises an X-address decoder 411, a parallel-load X-bidirectional shift register 412, an enable latch circuit 413, an X-directional buffer 415, and a mode switch 416.

The X-address decoder 411 receives X-directional (lateral) coordinate data (X address XADD) from the LCD controller 600. The X address, which may also be called write data, decoded by the X-address decoder 411 is loaded on the parallel-load X-bidirectional shift register 412.

The X address (or write data) from X-address decoder 411 is parallel-loaded by the parallel-load X-bidirectional shift register 412. Timing of the parallel load is determined by an X-load pulse (XLOAD) output from the LCD controller 600. The parallel-load X-bidirectional shift register 412 can shift the X address, which may also be called the write data or address data, in a right direction or a left direction by a serial shift pulse (Xsi) output from the LCD controller 600. The enable latch circuit 413 can latch the address (or write data) of the parallel-load X-bidirectional shift register 412 at timing of a latch enable pulse (LE). The X-directional buffer 415 can hold the X address (or write data) latched by the enable latch circuit 413 at timing of an X-enable pulse (XEN). The latch enable pulse (LE) and the X-enable pulse (XEN) pulse are output from the LCD controller 600.

Furthermore, the X address (or write data) of the X-directional buffer 415 can be supplied to the pixel circuit 311 via the mode switch 416.

The mode switch 416 is controlled by an X-switch control signal (XSW) from the LCD controller 600.

The mode switch 416 can control connection destinations of the signal column line Sj and the control column line Cj by the X-switch control signal (XSW).

In the example of the pixel circuit 311 shown in FIG. 3, the signal column line Sj is connected to a black-display voltage line BV, and the control column line Cj is connected to the X-directional buffer 415, under control of the X-switch control signal (XSW). If, for example, "1" (high level) is currently output to the control column line Cj, the first transistor TC is turned on. At this time, if the second transistor TR is turned on, a black-display voltage (data 1) is written in the memory 11.

Next, the Y-directional driver 500 will be described. The Y-directional driver 500 comprises a Y-address decoder 511, a parallel-load Y-bidirectional shift register 512, and an enable-attached Y-directional buffer 513.

The LCD controller 600 supplies Y-directional (longitudinal) coordinate data (Y address YADD) to the Y-address decoder 511. The LCD controller 600 supplies a Y-load pulse (Y LOAD) to the parallel-load Y-bidirectional shift register 512. In addition, the LCD controller 600 supplies Y-enable pulse (YEN) to the enable-attached Y-directional buffer 513.

The Y-address decoder 511 receives Y-directional (longitudinal) coordinate data (Y address) from the LCD controller 600. The Y address, which may also be called row designation data, decoded by the Y-address decoder 511 is loaded on the parallel-load X-bidirectional shift register 412. The Y address of the parallel-load X-bidirectional shift register 412 is latched by the enable-attached Y-directional buffer 513 and is output to the select row lines Ri and /Ri.

FIG. 3 simply shows parts of the outputs of the X-directional driver 400 and the Y-directional driver 500. The X-directional driver 400 and the Y-directional driver 500 can designate all the pixel circuits (not shown), other than the pixel circuit 311, by using the X address and the Y address.

In the handwriting input mode, the X-coordinate data and the Y-coordinate data from the TP controller 702 are input to the LCD controller 600. The X-coordinate data and the Y-coordinate data from the TP controller 702 are also input to the main CPU 800. The LCD controller 600 immediately executes partial rewriting in units of pixel circuits, based on the X-coordinate data and the Y-coordinate data from the TP controller 702. In addition, the main CPU 800 writes the drawing data to a frame memory (not shown), based on the X-coordinate data and the Y-coordinate data from the TP controller 702.

The TP controller 702 and the main CPU 800 are connected by a serial interface (S_I/F), and the TP controller 702 converts the coordinate data to serial data and supplies the serial data to the main CPU 800.

In not the handwriting input mode, but the general drawing mode, a drawling mode control signal is supplied from the main CPU 800 to the LCD controller 600. In the general drawing mode, the video data is supplied from the main CPU 800 to the LCD controller 600.

Figure 4:
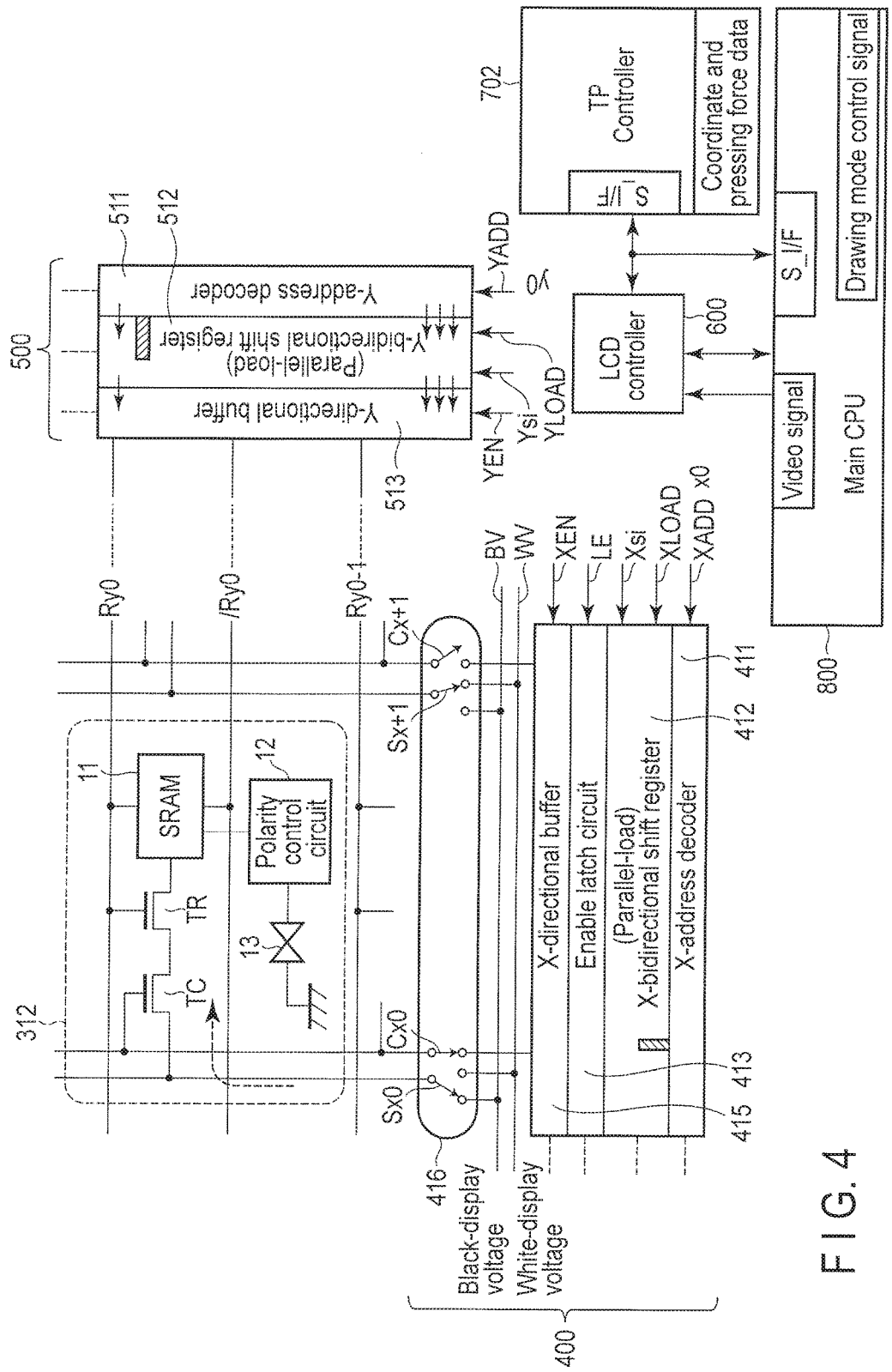
FIG. 4 is an illustration mainly showing an operation example of the embodiment together with signal flow, in a pixel circuit 312 shown in FIG. 2.

FIG. 4 mainly shows an operation example of the embodiment together with a signal flow, in the pixel circuit 312 shown in FIG. 2. FIG. 4 shows a circuit state in which a row select line Ry0 (output of positive potential) and a row select line /Ry0 (output of negative potential) are selected based on coordinate data (x0, y0) from the LCD controller 600, and in which a column control line Cx0 is connected to an output (logic "1") of the X-directional buffer 415 and a column signal line Sx0 is connected to a black-display voltage line DV, based on the operation of the mode switch 416.

In the connection state of FIG. 4, each of the first transistor TC and the second transistor TR is turned on, and logic "1" data from the column signal line Sx0 is held in the memory 11. As a result, an electric potential is applied to the display element 13 via the polarity control circuit 12 and, for example, an output of the display element 13 is turned off (i.e., brightness becomes low and black).

Figure 5:
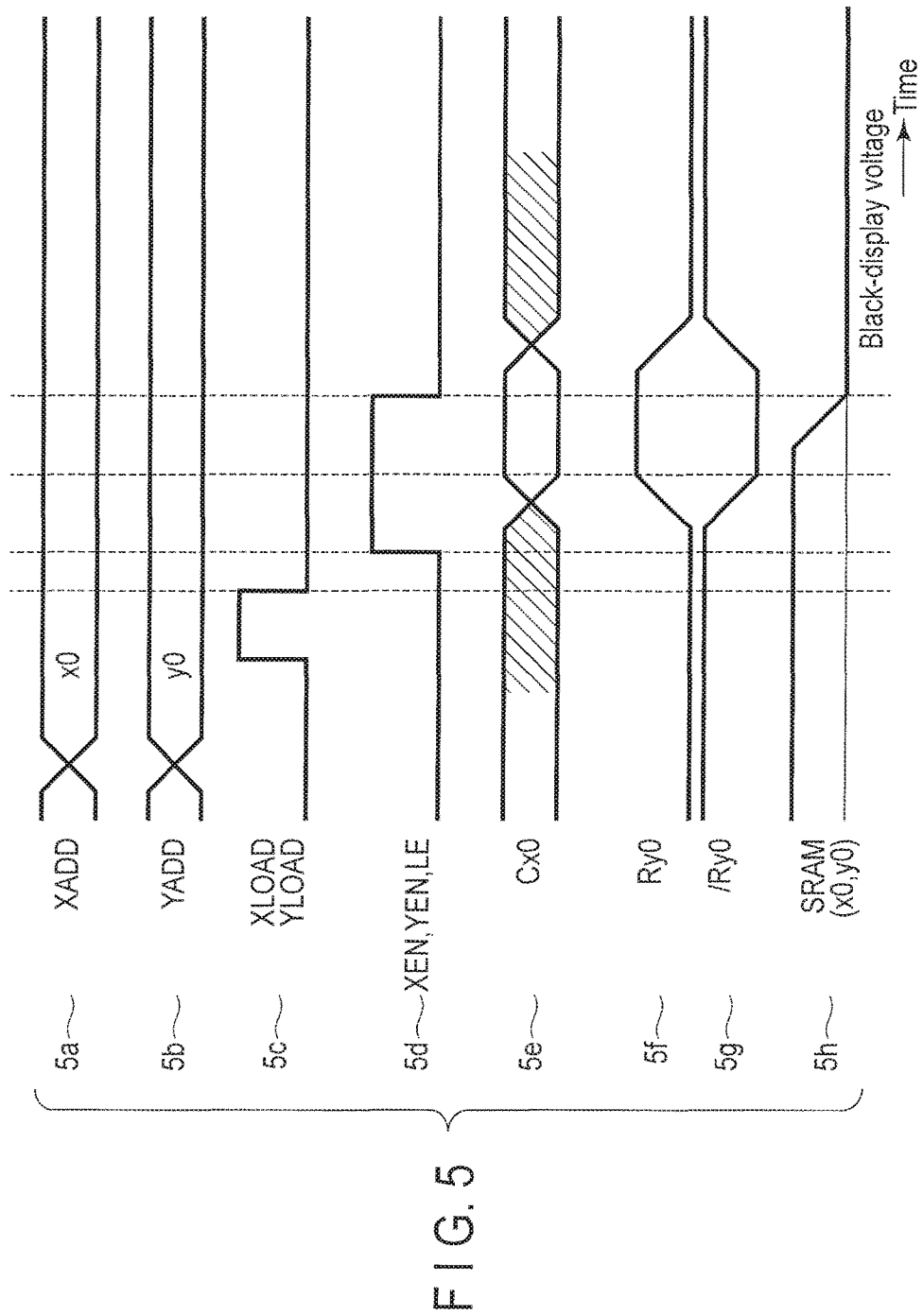
FIG. 5 is a graph mainly showing an operation example of the embodiment together with operation timing, in the pixel circuit 312 shown in FIG. 2.

FIG. 5 is a graph showing operation timing of each module of the circuit together with time elapse from a left side to a right side, to describe an operation example of the embodiment with reference to the pixel circuit 312 shown in FIG. 4.

In FIG. 5, each of 5*a* and 5*b* denotes an output time of coordinate data (x0, y0) from the LCD controller 600. In FIG. 5, 5*c* denotes a time in which elements of the coordinate data (x0, y0) are decoded by the decoders respectively, and the x0 coordinate data is loaded to the X-bidirectional shift register 412 and the y0 coordinate data is loaded to the Y-bidirectional shift register 512.

In FIG. 5, 5*d* denotes a time in which the data of the X-directional address of the X-bidirectional shift register 412 is latched by the enable latch circuit 413 and set at X-directional buffer 415, and in which the data of the Y-directional address of the Y-bidirectional shift register 512 is set at the Y-directional buffer 513. In FIG. 5, 5*e* denotes a time in which the data is output to the column control line Cx0, and 5*f* and 5*g* denote a time of the row select line Ry0 (output of positive potential) and the row select line /Ry0 (output of negative potential). Furthermore, 5*h* of FIG. 5 denotes a time in which the black-display voltage is held in the memory 11.

In the present embodiment, the address (write data or address data) decoded based on the coordinate data can be shifted based on a shift pulse.

FIG. 6 shows a situation in which the X-directional address data is shifted from the position of the pixel circuit 312 shown in FIG. 4 by an extent of one pixel circuit, in the X-bidirectional shift register 412, and in which the address data for column selection is shifted from the position of the pixel circuit 312 shown in FIG. 4 by an extent of one pixel circuit, in the Y-bidirectional shift register 512. As a result, the pixel circuit designated by the address data is changed from the pixel circuit 312 shown in FIG. 4 to the pixel circuit 321 shifted by one pixel, in both the row direction and the column direction.

Shift pulses Xsi and Ysi for obtaining the shift are generated based on an algorithm installed in the LCD controller 600. The designated address can be changed at a high speed by utilizing the shift pulses Xsi and Ysi.

Figure 7:
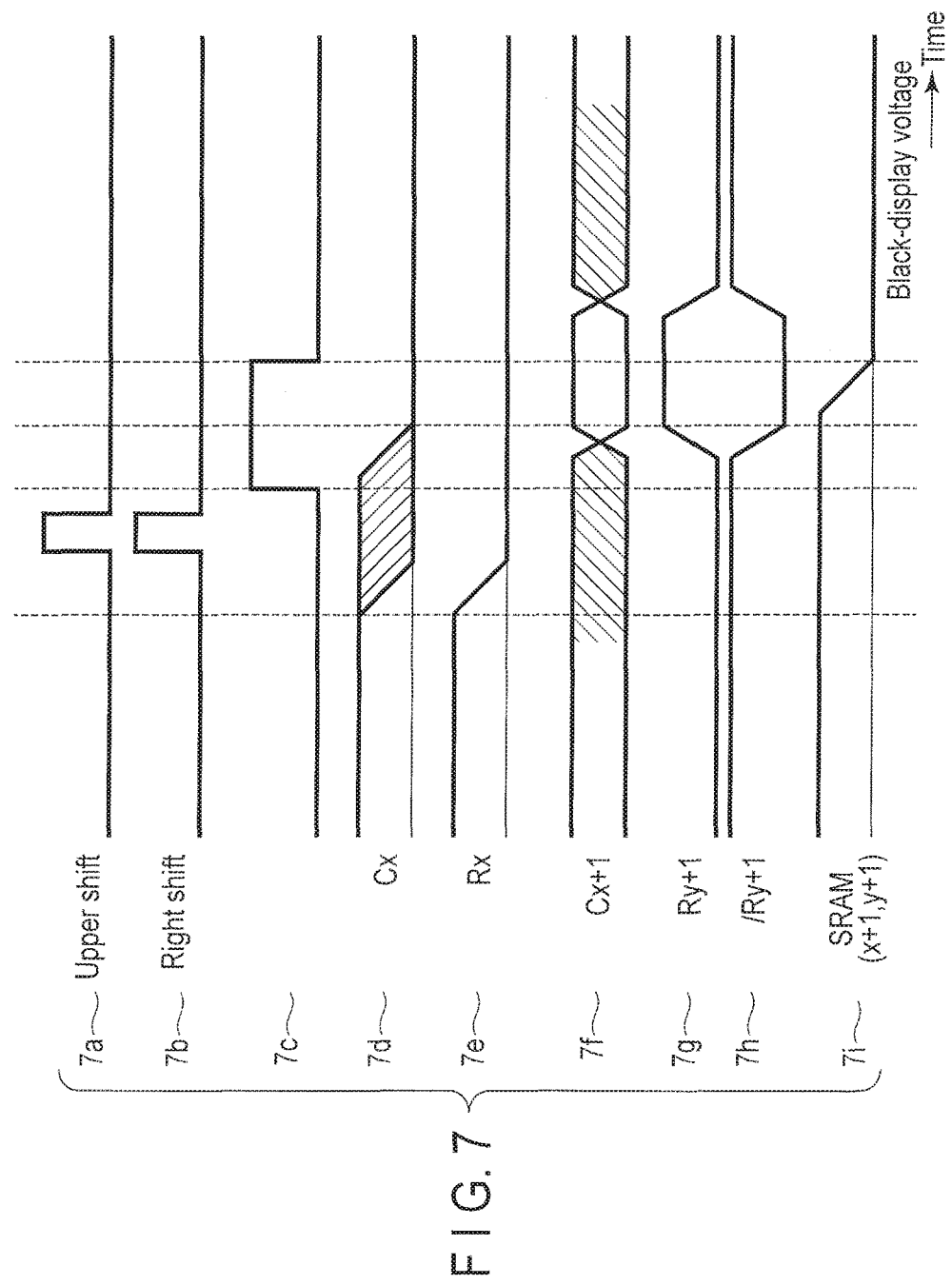
FIG. 7 is a graph mainly showing an operation example of the embodiment together with operation timing, in the pixel circuit 321 shown in FIG. 2.
Figure 8:
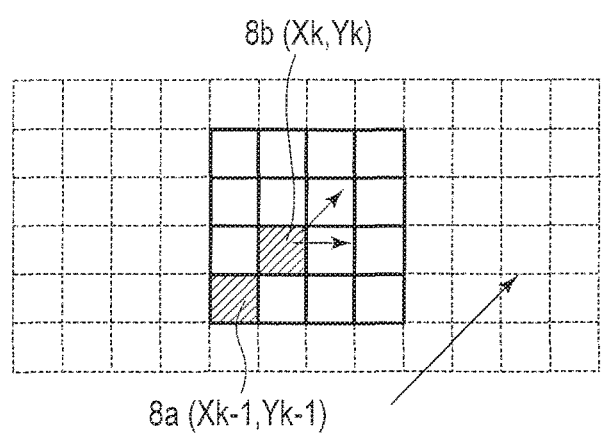
FIG. 8 is a graph showing an example of writing a pixel signal in a pixel circuit to describe the operation example of the embodiment.

FIG. 7 and FIG. 8 show a timing signal for describing a state in which the drawing line is varied by shifting the address data, and an image. It is assumed here that a pixel position 8a of FIG. 8 is drawn and then a pixel position 8b is drawn.

FIG. 7 shows operation timing of each module of the circuit together with time elapse from a left side to a right side. In FIG. 7, 7a denotes an upper shift pulse supplied to the Y-bidirectional shift register 512, and 7b denotes a right shift pulse supplied to the X-bidirectional shift register 412. In FIG. 7, 7c denotes a time (high level section) in which the data is output to a column control line Cx+1, and a time (high level section) in which the data is output to a row select line Ry+1 (output of the positive potential) and a row select line /Ry+1 (output of negative potential). In FIG. 7, 7d and 7e denote states of a column select line Cx and a row select line Rx obtained when a pixel position 8a of FIG. 8 is designated, respectively. In FIGS. 7, 7f, 7g and 7h denote states of a column select line Cx+1, a row select line Rx+1, and a row select line /Rx+1 obtained when a pixel position 8b of FIG. 3 is designated, respectively. In FIG. 7, 7i denotes a time in which the data is written in the memory 11 of the pixel position 8b of FIG. 8.

As described above, the display controller 600 can supply shift pulses to the X-bidirectional shift register 412 and the Y-bidirectional shift register 512. Thus, address data (i.e., address data designating the pixel position 8b in FIG. 8) approximate to first address data generated based on the touch input to the touch-type input panel 701 (i.e., address data designating the pixel position 8a in FIG. 8) is generated by using the first address data, according to shift operations of the X-directional driver 400 and the Y-directional driver 500.

The address data is adopted as interpolatory address data (i.e., address data designating the pixel position 8b of FIG. 8) that is linearly approximate between the first address data and second address data based on a subsequent touch input.

In the present embodiment, followability of drawing on the display screen responding to the handwriting input in the handwriting input mode, and followability of an image forming velocity on the LCD 301 or, more specifically, display responsiveness of a locus drawn on the touch input-type panel 701 and the locus displayed by the LCD 301 (i.e., drawing responsiveness of displaying the locus on the display screen of the LCD 301 as the drawing data), can be significantly improved. If a drawing direction of the handwriting input is estimated, the pixel position 8a and the pixel position 8b can be immediately drawn on the LCD 301 by the data shift technique described in FIG. 7 and FIG. 8.

FIG. 9 shows a state in which after ending the handwriting input, the data (i.e., video data including line data input by handwriting) as stored in the frame memory in the main CPU 800 in units of frame is written in the display device (LCD) 301. FIG. 9 shows an example of a state of a circuit which is operated in what is called the general drawing mode. The pixel circuit 310 is mainly exemplified in the figure.

At this time, video data for one line (one horizontal scanning line) is input from the main CPU 800 to the X-address decoder 411 and is set at the X-directional buffer 415. Next, the Y-directional driver 500 designates the pixel circuit in units of row. The video data stored in the frame memory in the main CPU 800 is thereby written in units of row, in each of the pixel circuits in the display device 301.

The mode switch 416 is utilized effectively. In other words, the first transistor TC of each pixel circuit is turned on and stands by to allow the LCD 301 to be accessed in units of row. For this reason, the voltage of a white-display voltage line WV is, supplied to a control electrode or the first transistor TC via the control column line connected to the white-display voltage line WV so as to become the high level. An input electrode of the first transistor TC is connected to an output stage corresponding to the X-directional buffer 415 via the signal column line and the mode switch 416.

Figure 10:
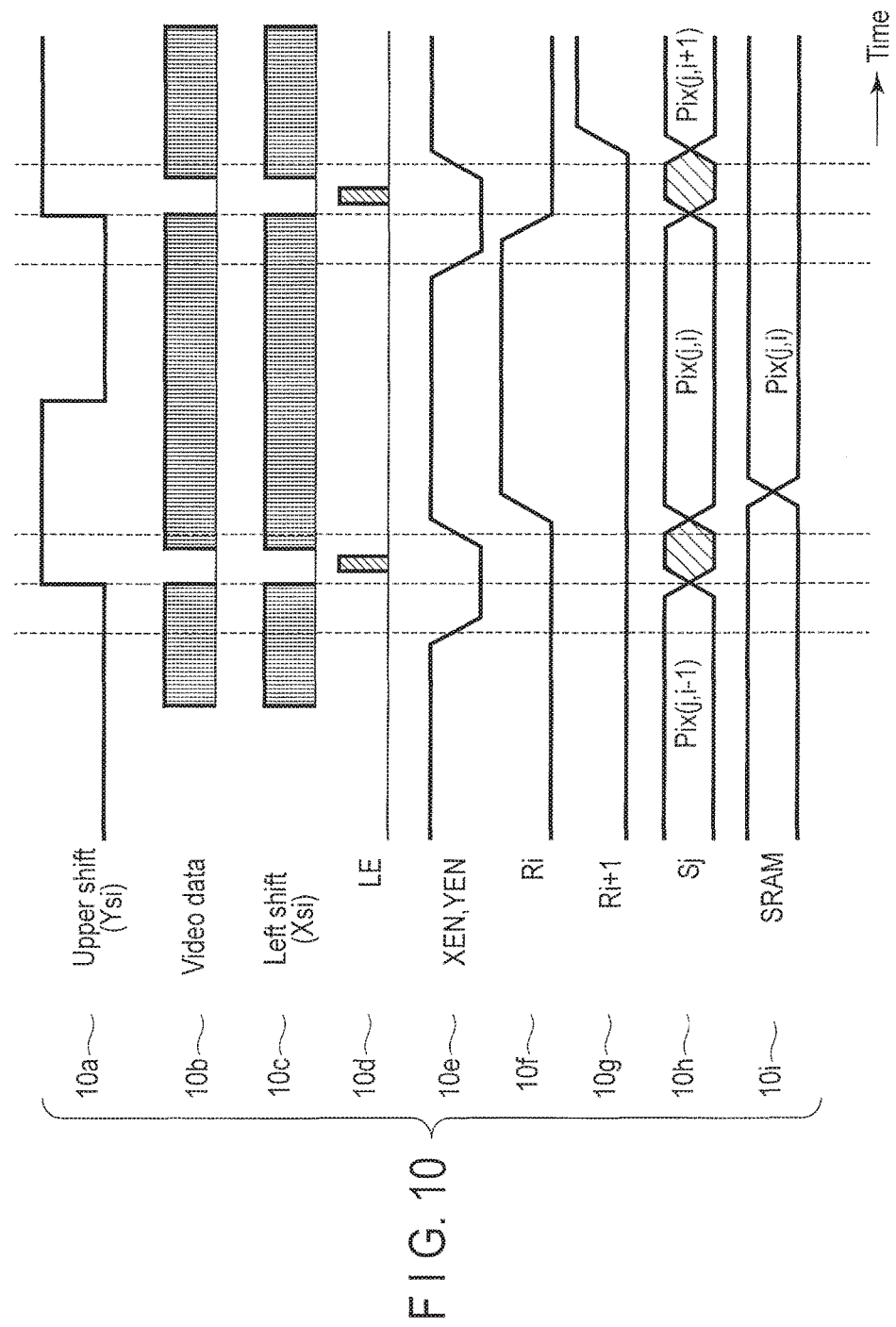
FIG. 10 is graph showing operation timing of each module in a circuit to describe an operation example of general drawing of the embodiment by referring to the pixel circuit 310 shown in FIG. 9.

FIG. 10 shows operation timing at execution of the general drawing mode. In the Y-bidirectional shift register 512, vertically synchronized data (not shown) is supplied to a first stage (for example, a row positioned in the lowermost stage). If the data is shifted by a shift pulse Ysi (10a in FIG. 10), the row select position can be shifted in units of row in, for example, an upper direction of the figure.

Video data for one row (10b in FIG. 10) is sequentially input from a first stage of X-bidirectional shift register 412 and shifted to a left direction by shift pulse Xsi (10c in FIG. 10). The video data for one row is thereby set in the X-bidirectional shift register 412.

The video data is entirely written in a row-selected pixel circuit, via the X-directional buffer 415, by a timing pulse.

In FIG. 10, 10d denotes a time of a latch enable pulse (LE). The pulse indicates a time at which the video data for one row is latched from the X-bidirectional shift register 412 to the enable latch circuit 413. In FIG. 10, 10e denotes a time of an X-enable pulse (XEN) and a Y-enable pulse (YEN). The data is set at the X-directional buffer 415 and the Y-directional buffer 513, based on the pulses. In FIG. 10, 10f denotes a time of a row select signal of a row in which the video data is to be written. In FIG. 10, 10g denotes a time of a row select signal of a next row in which the video data is to be written.

In FIG. 10, 10h denotes a time of video data which is to be written from the X-directional buffer 415 to the selected row, and 10i denotes a time of the data held in the memory 11.

In the operation mode, the mode switch 416 retains a switching state to keep the first transistor TC of each pixel circuit turned on at any time, and supplies, for example, the white display voltage WV to a control electrode of the first transistor TC. At the same time, the mode switch 416 is set such that an output of the K-directional buffer 415 is input to an input terminal of the first transistor TC. In this state, if the second transistor TR is turned on by the row select signal, the output signal of the K-directional buffer 415 is written in the memory 11.

Figure 12:
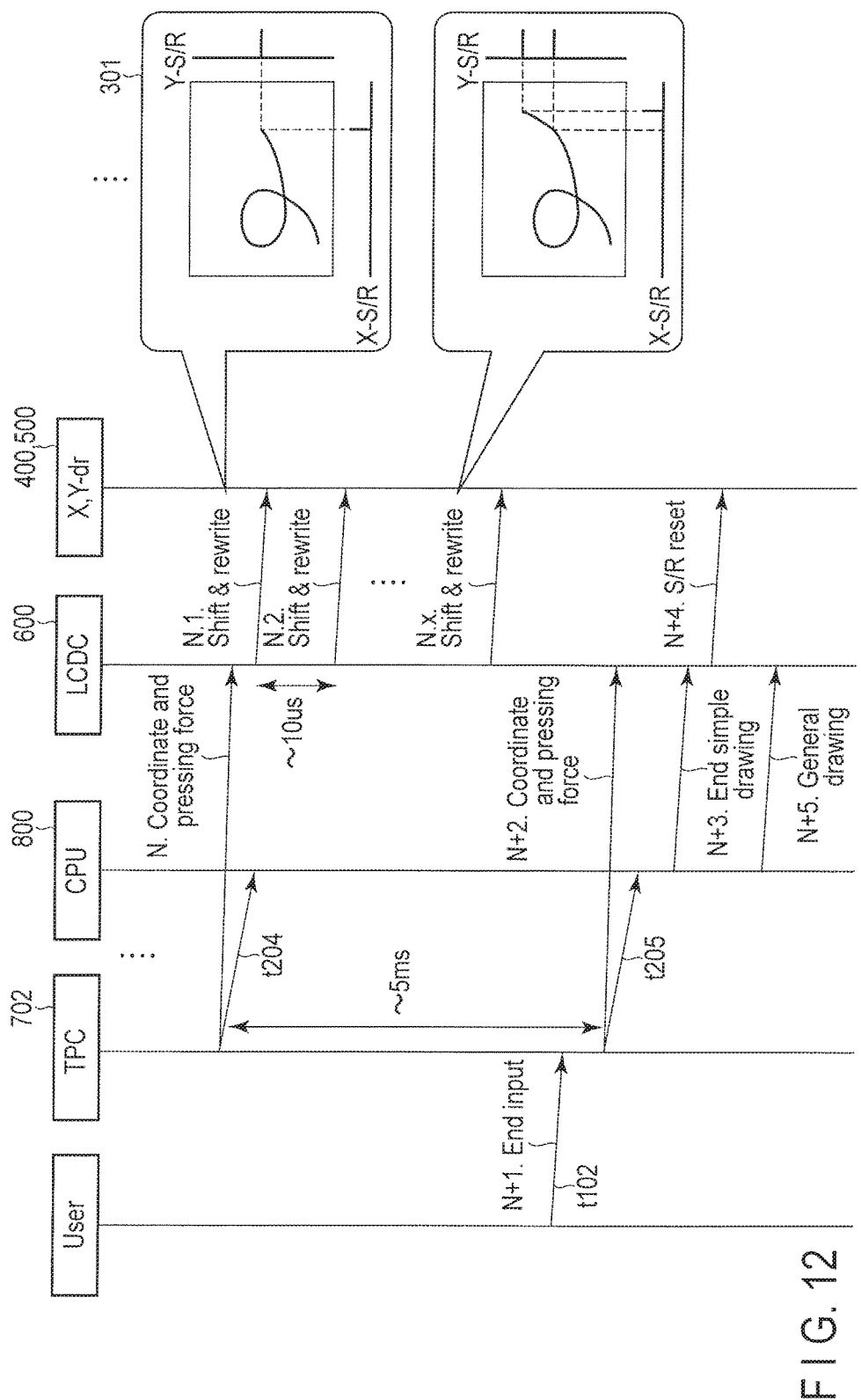
FIG. 12 is an illustration showing an operation subsequent to the operation shown in FIG. 11.

FIG. 11 and FIG. 12 show a sequence of operating the touch panel controller 702, the main CPU 800, the LCD controller 600, the X-directional driver 400 and the Y-directional driver 500 when the handwriting input mode is executed, together with the drawing on the LCD 301. It is assumed here that the user draws a locus of the pen tip on the touch-type input panel 701 while contacting the pen tip on the touch-type input panel 701 at Time t101 (FIG. 11) and moves the pen tip off the touch panel at Time t102 (FIG. 12).

The touch panel controller 702 detects a touch position of the pen tip with an interval equal to or shorter than, for example, 5 ms (Times t201, t202, t203, t204, t205, ...) and outputs the detected touch position as the coordinate data, in the present embodiment.

More specifically, when the user starts the above-described inputting, touch panel controller 702 detects a first sensor output from the touch-type input panel 701 and supplies the coordinate data (position) and the pressing force data (pressing strength) to the main CPU 800. The main CPU 800 thereby starts simple drawing, determines input start coordinate data, secures possibility of drawing, and supplies the input start coordinate data to the LCD controller 600. The data is thereby written to an input start position of the LCD 301.

When the touch panel controller 702 detects a subsequent sensor output (Time t202), the coordinate data and the pressing force data are input to the LCD controller 600 and the main CPU 800.

The LCD controller 600 executes the processing of shifting and rewriting the data by using the coordinate data detected at, at least, Time t202 and Time t203 such that a line is formed between both of the coordinates. The operations executed at the times have been described with reference to FIG. 4 and FIG. 6. As an algorithm, for example, "Brezenham's Line Algorithm", which paints pixels between the points and draws a straight line (or an approximate line), when a start point and an end point are supplied, is well known. According to the algorithm, which selects the pixel position to be written (or painted) subsequent to the current pixel position (X, Y) from eight pixel positions adjacent the current pixel position, a pixel position painted next to the current pixel position can be sequentially determined based on held inner variables (coordinates of the current pixel position and coordinates of a next pixel position, and so on).

For example, as shown in the LCD 301 in FIG. 11, if a line to be drawn from a lower left pixel position to a next write pixel position is smaller than forty-five degrees, a candidate pixel position to be painted next to the lower left pixel may be narrowed down a right pixel position or an upper right pixel position of the lower left pixel position. Next, which pixel position should be selected is determined based on the values of the current inner variables (and, simultaneously, the inner variables are updated). The pixel position to be written are sequentially specified based on the logic and, by repeating the control, the line extending from the start point to the end point is displayed on the display screen of the LCD 301. In FIG. 11, a rewrite (or write) pixel position is pictorially shown together with an arrow, in the LCD 301.

The shift and rewrite (or write) processing can be executed within, for example, 10 μs in the LCD controller 600 (see Time t401 and Time t402 in FIG. 11). Such shift and rewrite processing are repeated every time when the coordinate data is obtained at the touch panel controller 702.

If the coordinate data or pressing force data is not output from the touch panel controller 702, the main CPU 800 determines that the handwriting input mode is ended, as shown in FIG. 12. At this time, the main CPU 800 outputs an end command to the LCD controller 600. Thus, the LCD controller 600 resets the X-directional driver 400 and the F-directional driver 500. In addition, the main CPU 800 starts an operation of the general drawing (general drawing mode). In the general drawing, the main CPU 800 reads the video data written in the frame memory and starts the operation shown in FIG. 9.

The LCD 301 shown in FIG. 12 shows a state in which the above-described processing is executed (4 to 6.1 in FIG. 11 and N.1 to N.x in FIG. 12) and a broken line approximating a locus of the handwriting input is drawn.

A cycle of updating the coordinate data by the touch panel controller 702 is, for example, approximately 5 ms and the time required for drawing one pixel in the handwriting input mode is, for example, approximately, 10 μm.

Approximately 500 pixels can be rewritten during the period of 5 ms, which is sufficient for drawing a line segment. In addition, since a delay occurring at movement of the pen tip is approximately 10 ms at maximum (processing inside the touch panel controller is executed at 5 ms or less and the processing of drawing the line segment is executed at 5 ms or less), high-speed handwriting input can be executed.

Since the power consumption in the handwriting input mode is very small and since the entire display screen is simply updated at one time in the general drawing mode at the end of handwriting input, the power consumption can be suppressed throughout the sequence of the handwriting input.

Figure 13A:
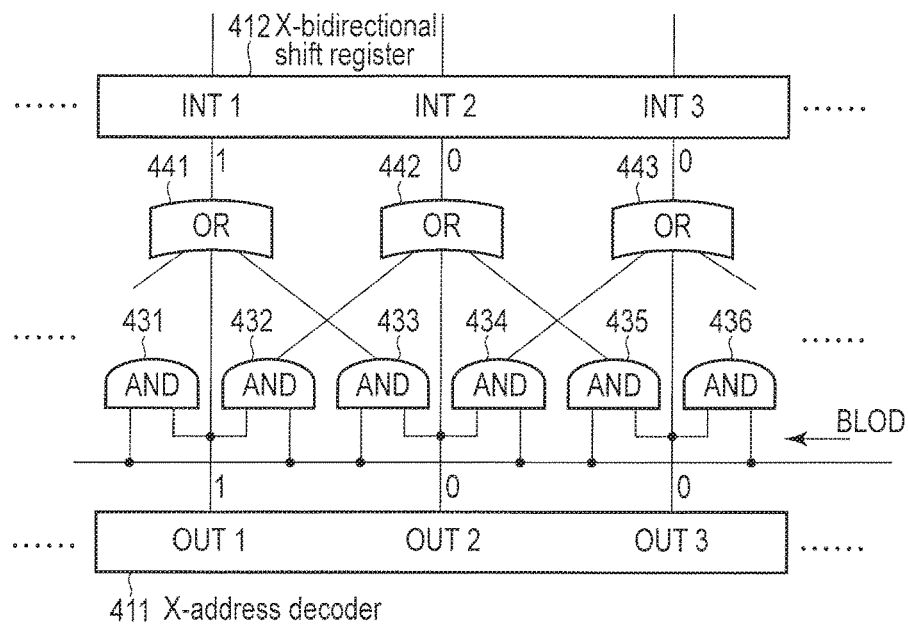
FIG. 13A is an illustration showing a configuration example of main portions of another embodiment.

FIG. 13A shows a basic principle of yet another embodiment according to the present embodiment. In this example, an X-directional driver 400 comprises a logic circuit configured to selectively change a one-to-one connection or a one-to-many connection as a connection between an output terminal of an X-address decoder 411 and a load input terminal of an X-bidirectional register 412. The example will be described below more specifically.

In FIG. 13A, AND circuits 431 to 436 and OR circuits 441 to 443 are provided between the X-address decoder 411 and the X-bidirectional shift register 412. It is assumed here that the X-address decoder 411 comprises three output terminals OUT1, OUT2 and OUT3.

A control signal BLOD can be supplied from an LCD controller 600 to either input terminal of each of the AND circuits 431-436. An output of the output terminal OUT1 of the X-address decoder 411 is input to the AND circuits 431 and 432. An output of the output terminal OUT2 of the X-address decoder 411 is input to the AND circuits 433 and 434. An output of the output terminal OUT3 of the X-address decoder 411 is input to the AND circuits 435 and 436.

The OR circuit 441 receives logic outputs, of outputs of an AND circuit 430 (not shown) and the AND circuit 433, and of the output of the output terminal OUT1, and inputs the logical outputs to an input terminal INT1 of the X-bidirectional shift register 412. The OR circuit 442 receives logic outputs, of outputs of the AND (circuits 432 and 435, and of the output of the output terminal OUT2, and inputs the logical outputs to an input terminal INT2 of the X-bidirectional shift register 412. The OR circuit 443 receives logic outputs, of outputs of the AND circuit 434 and an AND circuit 437 (not shown), and of the output of the output terminal OUT3, and inputs the logical outputs to an input terminal INT3 of the X-bidirectional shift register 412.

If a control signal BLOD is "0", the outputs of the output terminals OUT1 to OUT3 of the X-address decoder 411 are directly input to the input terminals INT1 to INT3 of the X-bidirectional shift register 412 (i.e., one-to-one relationship). However, if the control signal BLOD is "1", each of the outputs of the output terminals OUT1 to OUT3 of the X-address decoder 411 is input to three input terminals INT1 to INT3 of the X-bidirectional shift register 412 (i.e., oneto-three relationship). Thus, thickness of the drawn line can be varied by changing the control signal BLOD.

FIG. 13A shows an example of variation in 3) thickness of the line in the X direction. The figure does not show the variation in thickness in the Y direction, but the Y-directional driver is configured to select three column select lines, in the Y direction. Accordingly, the line which is three times as thick in the X direction and the Y direction can be thereby drawn.

Figure 13B:
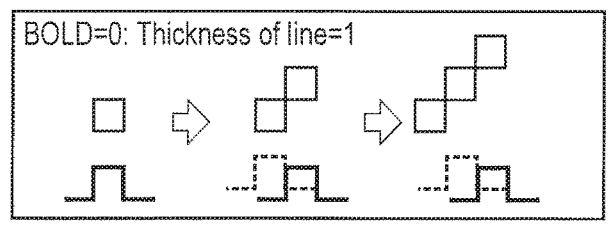
FIG. 13B is an illustration showing data rewriting processing to describe an operation of a circuit shown in FIG. 13A.
Figure 13C:
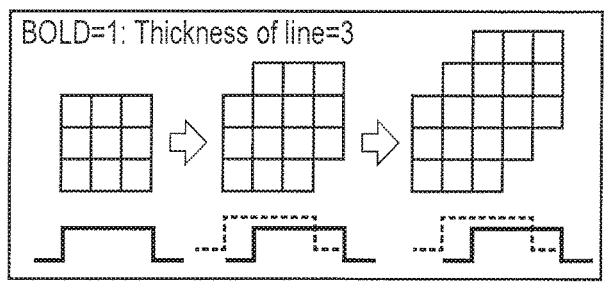
FIG. 13C is an illustration showing data rewriting processing to describe yet another operation of the circuit shown in FIG. 13A.

FIG. 13B pictorially shows a state of the screen in which the control signal BLOD is "0" and a line having thickness 1 is drawn. FIG. 13C pictorially shows a state of the screen in which the control signal BLOD is "1" and a line having thickness 3 is drawn.

The above examples show mere examples. A circuit configured to selectively draw lines having various types of thickness can be further formed by combining various logic circuits, between the X-address decoder 411 and the X-bidirectional shift register 412. In other words, the thickness of the line to be drawn can be arbitrarily varied by forming a logic circuit for an arbitrary combination between the outputs of the X-address decoder 411 and the inputs of the X-bidirectional shift register 412.

The same idea with the X direction process is applied in the Y direction process, that is, a logic circuit for an arbitrary combination is provided between the outputs of the Y-address decoder 511 and the inputs of the Y-bidirectional shift register 512.

In the present embodiment, the touch panel controller 702 converts the output of the touch-type input panel 701 to the coordinate data and the pressing force value and outputs the coordinate data and the pressing force value. The pressing force value is compared with a threshold value V1 in the LCD controller 600 and a main CPU 800.

Figure 14A:
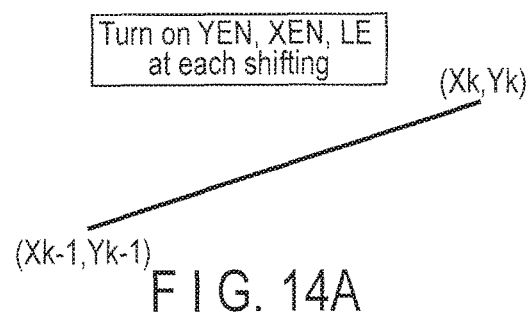
FIG. 14A is an illustration for describing a case where a straight line is drawn by the display device shown in FIG. 1.

Each of the LCD controller 600 and the main CPU 800 determines that a solid line is drawn if it is sequentially detected that the pressing force value is equal to or greater than a predetermined threshold value V1. FIG. 14A shows an example of a solid line drawn on the LCD 301. The LCD controller 600 turns on LE, XEN and YEN (shown in FIG. 9, FIG. 10, etc.) every time the LCD controller 600 shifts the drawing data and writes the data at a next position.

Figure 14B:
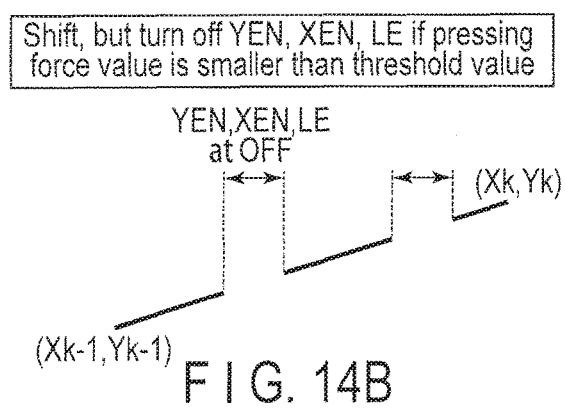
FIG. 14B is an illustration for describing a case where a broken line is drawn by the display device shown in FIG. 1.

Each of the LCD controller 600 and the main CPU 800 determines that a dash line is drawn if it is alternatively detected the pressing force value which is equal to or greater than the predetermined threshold value V1 and the pressing force value which is smaller than V1. FIG. 14B shows an example of a broken line drawn on the LCD 301. The LCD controller 600 executes processing of shifting the drawing data and writing the data at a next position, but turns off LE, XEN and YEN (shown in FIG. 9, FIG. 10, etc.) during a period in which the pressing force value is smaller than the predetermined threshold value V1.

Figure 15:
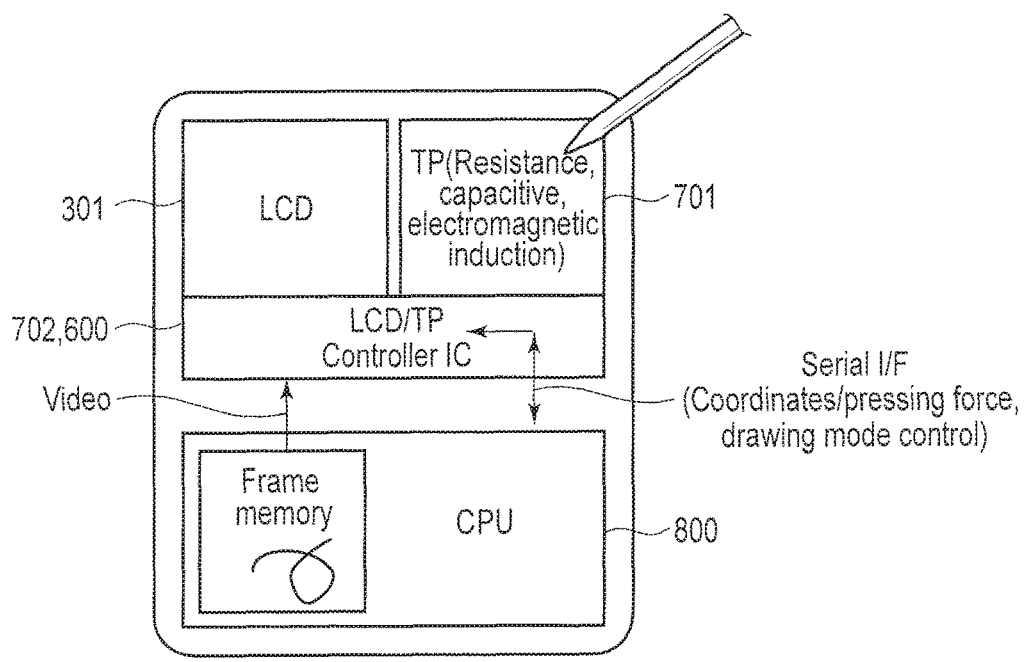
FIG. 15 is an illustration showing another embodiment of the display device.

In the above-described embodiment, the touch panel controller 702 and the LCD controller 600 are constituted separately, but may be integrated as one body. FIG. 15 shows a constitution example in which the touch panel controller 702 and the LCD controller 600 are integrated.

Figure 16:
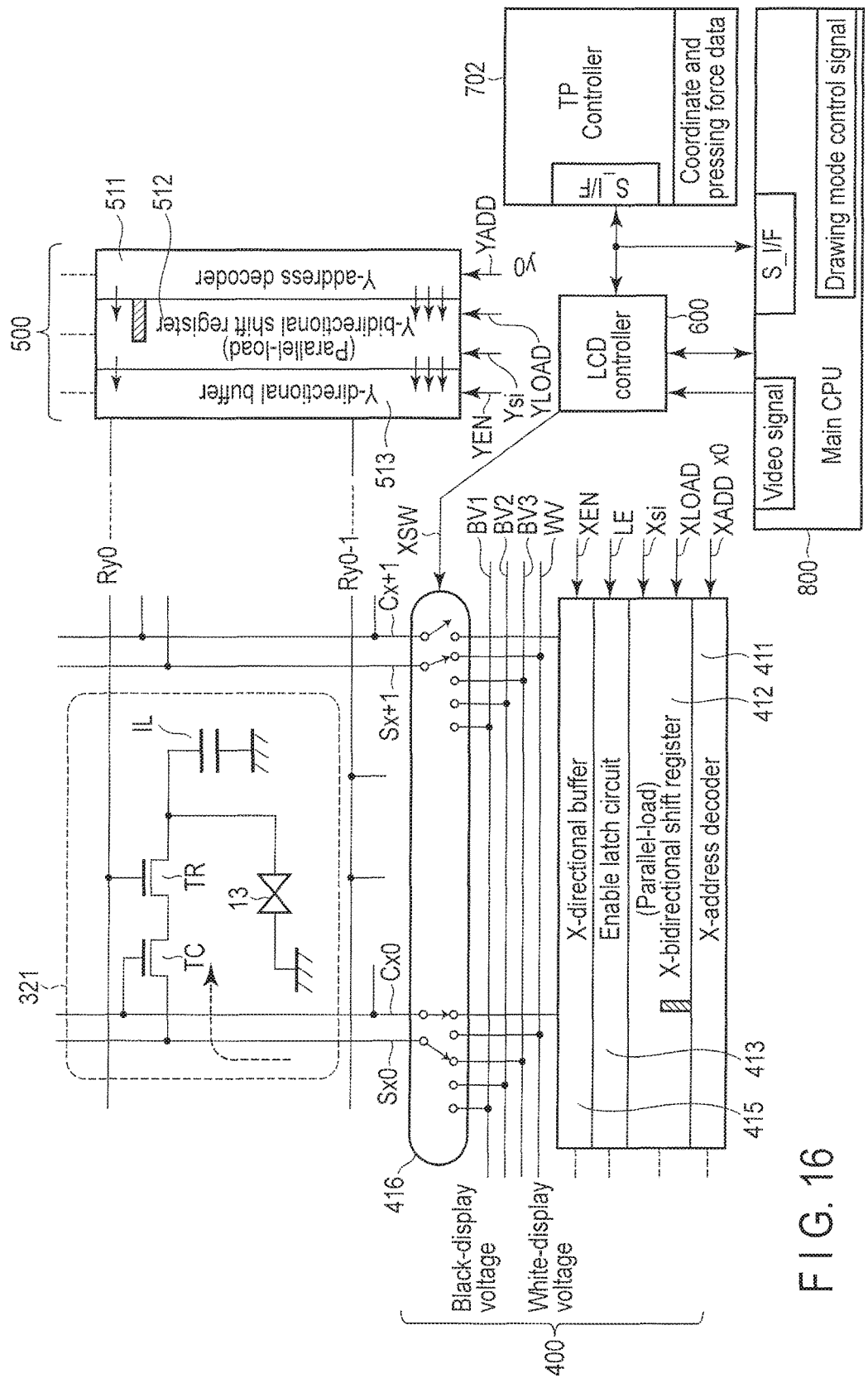
FIG. 16 is an illustration showing yet another embodiment of the display device.

FIG. 16 shows yet another embodiment. The same portions as those of the embodiment shown in FIG. 3 are denoted by the same reference numbers as those in FIG. 3. The present embodiment describes an example of employing not an SRAM, but an auxiliary capacitance (capacitor) IL as a memory 11. In addition, in the present embodiment, not simply "1" or "0", but a plurality of voltage lines BV1 to BV3 and WV can be selectively input to the auxiliary capacitance (capacitor) IL serving as the memory. By selecting the voltage, a liquid crystal display element 13 can obtain a plurality of brightness levels (i.e., a plurality of contrast levels).

An X-switch control signal (XSW) which controls the mode switch 416 can select an arbitrary voltage, based on the pressing force value detected, by the LCD controller 600, for example.

Furthermore, according to the present embodiment, a line drawn by the touch input is subjected to multi-gradation expression, and an image based on video data can also be subjected to multi-gradation expression. In other words, when the video data is output from a main memory 800, the multi-gradation expression of the image can also be executed by selecting an arbitrary voltage of the voltage lines BV1 to BV3 and WV for each of the pixel circuits.

As yet another embodiment, a configuration of inputting multi-bit video data to an X-bidirectional shift register 412 can be adopted. When the video data is output from the X-directional buffer 415 to the pixel circuit, the video data may be digital-analog-converted and then supplied to the input terminal of a transistor TC. At this time, a control electrode of the transistor TC is provided with, for example, a certain voltage and is connected to, for example, BV1.

In the handwriting input mode, only one of row select lines, for example, Ry0 and only one of column select lines, for example, Cx0 are made active by an address decoder, and the voltage corresponding, to drawing data is written to the pixel circuits from a source line, for example, Sx0. The line can be therefore automatically drawn by appropriately repeating the shift of the bidirectional shift registers (in the X and Y directions), after drawing an input start point.

In the above embodiment, a monochrome display device has been explained for simple explanation. However, a full-color display device can also be implemented by merely changing the shifting manner of the bidirectional shift register (for example, shifting every three bits in the X direction as an RGB pixel constitution).

In the general drawing mode, the video data for one row is shifted by an X-directional shift register for images of an X-directional driver, held at a latch at approximate timing, digital-analog-converted, amplified, and converted to an analog signal, which is output to the source line, while scanning the row select line by a Y-directional driver.

At this time, a control column line Cj (j=1, 2, . . . , n) is made active at any time and all of column select transistors are turned on in advance.

An oxide semiconductor TFT driving LCD may be employed as the display device having characteristics of the pixel memory of the present embodiment.

In the above embodiment, an oxide semiconductor TFT (transistor TC, TR) having a less leak current may be employed.

In the above-described embodiment, if a report rate of the touch panel controller IC is 200 Hz, the drawing delay to the pen tip is equal to or shorter than 10 ms, i.e., the drawing becomes comparatively accelerated as compared with the conventional input-output system (with the delay being longer than 100 ms).

In addition, necessary minimum circuit portions alone are operated by the simple drawing of executing the rewriting by units of pixel circuits. The power consumption is therefore lowered. In addition, since the general drawing is executed at the end of handwriting input or in each predetermined cycle (for example, once in a second), the power consumption is low.

FIG. 17 concretely shows the memory 11 and the polarity control circuit 12 shown in FIG. 3 and FIG. 4.

A function of each module will be described. TFT 21 and TFT 22 constitute a first inverter, and TFT 23 to TFT 26 constitute a clocked inverter. TFT 31 and TFT 32 constitute a polarity inverting switch, and TFT 33 and TFT 34 constitute a second inverter.

In an operation of rewriting the pixel potential, a row select line Gate becomes "H", a row select line GateB becomes "L", a control line PolA becomes "L", and a control line PolB becomes "H". At this time, transistors TC and TR are turned on, the clocked inverter constituted by the TFT 23 to TFT 26 is turned off, and the TFT 31 is turned on. A conductive route Rout1 is thereby formed.

If the signal column line Sj is at the high level, the TFT 34 is turned on and a potential VLCL is applied to the display element 13. Oppositely, if the signal column line Sj is at the low level, the TNT 33 is turned on and a potential VLCH is applied to the display element 13.

Next, AC-driving the pixel electrode while holding the potential of the SRAM (memory 11) will be described. At this time, the row select line Gate is "L", the row select line GateB is "H", and a resetting switch RSW is turned off.

A case where the potential of the signal column line Si is "H" will be described. Potentials of nodes a1 and a3 are "H" and a potential of a node a2 is VLCL. Since the row select line Gate is "L", the transistors TC and TR become in an OFF state. However, since the row select line GateB is "H", the clocked inverter constituted by the TFT 23 to TNT 26 becomes in an ON state and the potential of the node a3 becomes VLCH. Since the potential of the node a1 also becomes equal to the potential of the node a3, the SRAM circuit 11 holds the rewriting state.

In other words, the potentials of the node a2 and the node a3, which are the outputs of the SRAM circuit 11, hold VLCL and VLCH, respectively.

When the potential of the control line PolA is "L" and the potential of the control line PolB is "H", the potential of the output terminal of the polarity inverting switch using the TFT 32 and TFT 31 becomes VLCH since the TFT 31 becomes in the OH state and the TFT 32 becomes in the OFF state. Therefore, the TFT 34 becomes in the ON state and the potential VLCL is applied to the pixel electrode PE, in the second inverter circuit constituted by the TFT 33 and TFT 34.

When the potential of the control line PolA is "H" and the potential of the control line PolB is "L", the potential of the output terminal of the polarity inverting switch becomes VLCL since the TFT 31 becomes in the OFF state and the TFT 32 becomes in the ON state. Therefore, the TFT 33 becomes in the ON state and the potential VLCH is applied to the pixel electrode PE, in the second inverter circuit.

Thus, the voltage applied to the liquid crystal can be alternated by alternately switching the polarities of the control line PolA and the control line PolB.

When the potential of the signal line S is "L" in the pixel potential rewriting operation, the potential of the node a2 holds VLCH and the potential of the node a3 holds VLCL. In this case, too, however, the voltage applied to the liquid crystal can be alternated by alternately switching the polarities of the control line PolA and the control line PolB.

In each of the embodiments, a transparent amorphous oxide semiconductor (TAOS) may be used as the transistors TC and TR.

In the above descriptions, the names used in each block are not limited to those, but names having functions of similar purposes are in the category of the present invention. When the blocks are divided or incorporated and displayed, they are in the category of the present invention if they present the concept of the present invention.

Furthermore, the components of claims are in the category of the embodiments even if the components are expressed separately, even if the components are expressed in association with each other or even if the components are expressed in combination with each other. Even if the claims are expressed as methods, the device is applied to the methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirt of the inventions. The accompanying claims and their equivalents are intended to cover such forms or modifications as would fall within the scope and spirit of the inventions.

What is claimed is:

1. A display device, comprising:
an array of a plurality of pixel circuits, each of the plurality of pixel circuits including a display element, a pixel memory configured to store a signal to drive the display element, and a first switch element;
an X-directional driver and a Y-directional driver configured to select and drive an arbitrary one of the pixel circuits; and
a display controller configured to partially rewrite a pixel signal stored in at least one of the pixel memories, via the X-directional driver and the Y-directional driver, wherein
the X-directional driver comprises:
a signal column line for supplying an input to the pixel memory via the first switch element;
a control column line for selecting the arbitrary pixel circuit, the control column line connected to the first switch element to connect the signal line to the pixel memory or not;
an X-directional buffer configured to output a select signal for selecting the arbitrary pixel circuit;
two voltage lines having preset different fixed potentials; and
a mode switch configured to connect arbitrarily the control column line to the X-directional buffer, and to connect the signal column line to one of the two voltage lines.

2. The device of claim 1, wherein
the X-directional buffer is configured to output the pixel signal for the pixel circuit; and
the mode switch is configured to connect the signal column line to the X-directional buffer configured to output the pixel signal, and to connect the control column line to one of the voltage lines.

3. The device of claim 2, wherein
the control column line is connected to the one voltage line which has lower voltage than the other.

4. The device of claim 1, wherein
the X-directional driver comprises:
an X address decoder configured to create address data and to specify a column of the pixel circuits in the X direction;
an X-bidirectional shift register loaded with the address data from the X address decoder and configured to shift the address data to an arbitrary X-directional position; and the X-directional buffer configured to retain an output of the X-bidirectional shift register, and the display controller supplies a shift pulse to the X-bidirectional shift register and varies a column specified by the address data.

5. The device of claim 1, wherein the X-directional driver comprises a logic circuit configured to selectively change a one-to-one connection and a one-to-many connection, between an output terminal of the X address decoder and a load input terminal of the X-bidirectional shift register.

6. The device of claim 1, wherein the Y-directional driver comprises:

select row lines connected to each of the pixel circuits for selecting the arbitrary pixel circuit; and an Y-directional buffer configured to output a select signal to one of the select row lines for selecting the arbitrary pixel circuit.

7. The device of claim 6, wherein each of the pixel circuits includes a second switch element between the first switch element and the pixel memory, and the one of the select row lines is connected to the second switch element to connect the first switch element to the pixel memory or not.

8. The device of claim 6, wherein the Y-directional driver comprises:

an Y address decoder configured to create address data and to specify a row of the pixel circuits in the Y direction;

an Y-bidirectional shift register loaded with the address data from the Y address decoder and configured to shift the address data to an arbitrary Y-directional position; and an Y-directional buffer configured to retain an output of the Y-bidirectional shift register, and the display controller supplies a shift pulse to the Y-bidirectional shift register and varies a row specified by the address data.

9. The device of claim 1, wherein the pixel circuit comprises a static random access memory retaining 1 bit for data retention.

10. The device of claim 1, wherein the pixel circuit comprises an auxiliary capacitance retaining a plurality of voltage levels for data retention.

* * * * *